(No Model.)

P. B. DOTY.
Seed Planter.

No. 236,147.   Patented Jan. 4, 1881.

Witnesses:  Inventor:
Peter B. Doty,
per C. A. Watson & Co., Attorneys.

United States Patent Office.

PETER B. DOTY, OF CONNEAUT, OHIO.

SEED-PLANTER.

SPECIFICATION forming part of Letters Patent No. 236,147, dated January 4, 1881.

Application filed June 30, 1880. (No model.)

*To all whom it may concern:*

Be it known that I, PETER B. DOTY, of Conneaut, in the county of Ashtabula and State of Ohio, have invented certain new and useful Improvements in Seed-Planters; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to certain improvements in seed-planters, having for its object to improve the operation of the same; and it consists in the construction and arrangement of parts as will be hereinafter more fully set forth.

Figure 1:
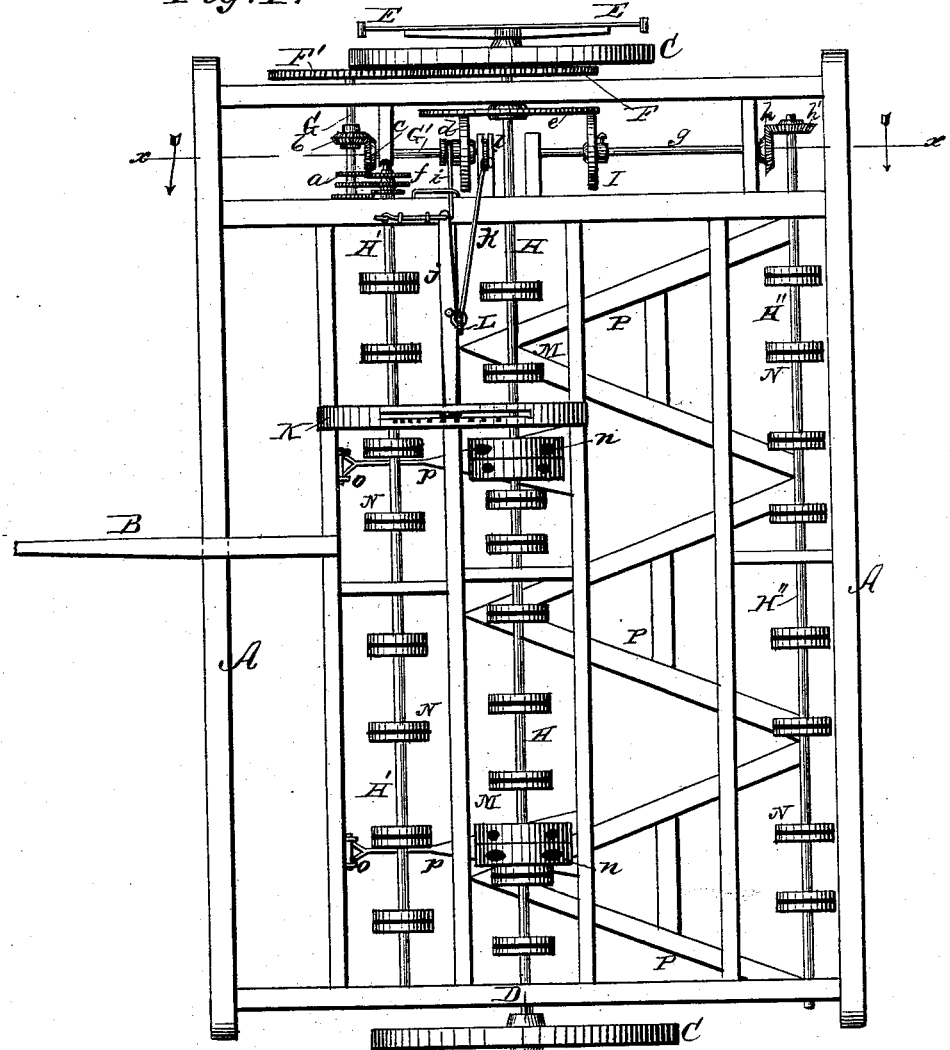
Figure 2:
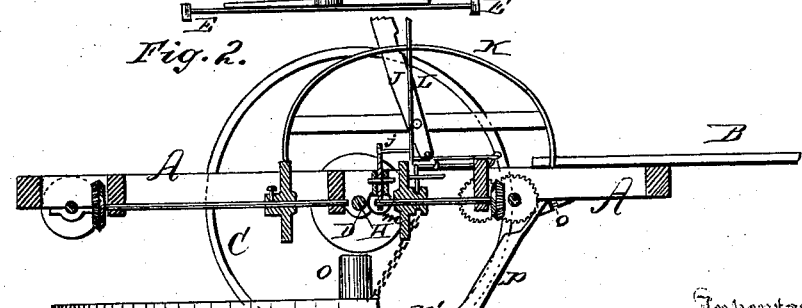

In the annexed drawings, Figure 1 is a plan view; and Fig. 2, a side elevation, partly in section.

A represents the frame of my planter, provided with the tongue B, and C are the wheels, revolving on the axles D. To the hubs of the wheels C are secured the markers E, and to the rear of said markers, on said hub, is the gear-wheel F, which meshes with a gear-wheel, F', secured on a short shaft, G, working in suitable bearings in the frame. Upon this short shaft G are the pinions a and b, which are made adjustable on said shaft by means of set-screws. The pinion b is provided with two beveled cog-faces, for the purpose hereinafter explained.

G' is a short shaft adapted to slide in a bearing in the frame, provided at one end with the beveled pinion c, engaging with the pinion b, and at the other end with a friction-wheel, d, which imparts motion to a disk, e, keyed or otherwise secured to the central shaft, H. The pinions a upon the short shaft G mesh with the pinions f, secured to the shaft H', and impart a rotary motion thereto.

I represents a friction-wheel secured upon a shaft, g, and adjustable thereon by means of a set-screw, said shaft having at one end a pinion, h, which meshes with a pinion, h', secured to a shaft, H'', and imparts to said shaft H'' a rotary motion, as imparted to the friction-wheel I, which bears against the face of the disk e. The hub of the friction-wheel d is provided with a circular groove, in which rests a bar, i, said bar being connected, by means of suitable connecting-rods, j, to a lever, J, pivoted to an arched rack, K, upon the frame A.

To a cross-bar of the frame is pivoted a lever, L, and is connected, by means of connecting-rod k, to one end of a pivoted bar, l. The other end of said bar l is provided with a bearing for the shaft G', and, in turn, bears against a spring, m. Upon the central shaft, H, are placed the distributers M, for planting in hills and for fertilizers to the same.

Upon the shafts H' H'' are placed the distributers N, for fertilizers, wheat, &c. The size of the pockets of the distributers for planting corn may be varied by means of a screw, n, which is adjusted up or down to lessen or increase the capacity of the pockets. The distributers are adjustable upon the shafts.

O represents a conductor for planting in hills or rows, having a shoe, n', said conductor being pivoted to the rod o and provided with an arm or colter, p. The arm p may be adjustable on the rod o by means of a set-screw, whereby the conductor may be shifted to either side.

To the under side of the frame are secured, in any suitable manner, any desired number of harrows or plows, P, arranged in any suitable position to accomplish the desired object.

By this arrangement it will be observed that the revolution of the wheels will revolve the wheel F, which will mesh with the gear-wheel F', and impart motion to the shaft G. The shaft G, carrying the pinion b, imparts motion to the shaft G' through the pinion c, and the friction-wheel d on said shaft imparts motion to the disk e, which revolves the central shaft, H. The disk e imparts motion to the shaft g through the wheel I, and to the rod H'' by beveled pinions h h'. The shaft H' receives its motion direct from the shaft G by means of the pinions a f.

As has been before stated, the pinion b is provided with two beveled cogged faces, and is adjustable on the shaft G, by which means it can be placed on the other side of the pinion $c$, and the motion of the main shaft H reversed, the importance of which is, that in sowing wheat broadcast I will be able to throw the seed forward, thereby enabling me to place the forward parts of my cultivators or harrows a little in front of the main shaft. In planting in hills, however, the forward motion is desirable.

It will also be observed that the use of the friction-wheel $d$ is of importance, for the reason that heretofore in planting in rows both ways it was found that the wheels did not pass over the ground evenly, for the draft of the machine would make it gain a little over the distance around the wheel, which would cause the check-markers to overrun a little each time that the machine was run in opposite directions. The same thing would also occur in passing over uneven ground, and I have therefore placed the friction-wheel to be adjustable by means of the lever J, whereby the wheel may be made to slide either way on a feather, and by graduating the lever it is an easy matter to keep the check-marker in position to insure uniformity of rows. Again, by this arrangement I am enabled to increase or decrease the motion of the shaft about one-half, which change will enable me to plant the hills almost any distance apart.

It will be observed that by the arrangement of the lever L and its connections the main part of the machine may be instantly thrown in and out of gear.

By the arrangement of the pinions $a$ the speed of the shaft H' may be increased or decreased by shifting the pinions $f$ from the greater to the smaller, as may be desired, without removing the pinions from the shafts.

The conductor O, having the plow or shoe attached, may be run any desired depth by placing weights upon the same.

Having thus fully described my invention, what I claim as new, and desire to secure by Letters Patent, is—

1. The frame A, wheels C, and gear-wheels F F', in combination with the shaft G, carrying the double-beveled adjustable pinion $b$, shaft G', and pinion $c$, substantially as and for the purpose set forth.

2. The frame A, wheels C, and gear-wheels F F', in combination with the shaft G, carrying the double-beveled pinion $b$, shaft G', carrying pinion $c$ and wheel $d$, and the disk $e$, substantially as and for the purpose specified.

3. The gear-wheels F F', shaft G, carrying the adjustable beveled pinion $b$, and shaft G', carrying pinion $c$ and wheel $d$, in combination with the disk $e$, shaft $g$, carrying pinion $h$, and wheel I. for imparting rotary motion to the shafts H H' H², substantially as described, and in the manner set forth.

In testimony that I claim the foregoing as my own I have hereto affixed my signature in presence of two witnesses.

PETER B. DOTY.

Witnesses:
   ALLEN M. COX,
   HARLEY FAIRBROTHER.